United States Patent [19]
Augustin

[11] 3,729,204
[45] Apr. 24, 1973

[54] SEALING SLEEVE, ESPECIALLY FOR RADIAL SHAFT SEALING RINGS

[75] Inventor: Gustav Augustin, Heilbronn/N., Germany

[73] Assignee: Kupfer Asbest Co. Gustav Bach, Heilbronn/N., Germany

[22] Filed: Aug. 10, 1970

[21] Appl. No.: 62,559

[30] Foreign Application Priority Data

Jan. 16, 1969 Germany..................P 19 41 675.2

[52] U.S. Cl.................................277/134, 277/163
[51] Int. Cl.............................F16j 15/32, F16j 15/54
[58] Field of Search.....................277/134, 152, 153, 277/157, 163, 164, 178, 182, 189, 200, 205, 206, 215

[56] References Cited
UNITED STATES PATENTS

| | | | |
|---|---|---|---|
| 2,670,976 | 3/1954 | Owen | 277/189 X |
| 3,482,845 | 12/1969 | Bertrandi et al. | 277/134 |
| 3,158,379 | 11/1964 | Nava et al. | 277/206 |
| 3,011,815 | 12/1961 | Guite | 277/182 |

FOREIGN PATENTS OR APPLICATIONS

| | | | |
|---|---|---|---|
| 1,152,783 | 9/1957 | France | 277/153 |
| 727,814 | 4/1955 | Great Britain | 277/152 |

*Primary Examiner*—Houston S. Bell, Jr.
*Attorney*—Walter Becker

[57] ABSTRACT

A sealing sleeve, especially for a radial shaft sealing ring with an inwardly located annular sealing lip connected by an annular diaphragm with an outer holding member in which said diaphragm is considerably thinner than the radial thickness of the sealing lip and the thickness of said holding member, while said diaphragm is reinforced by circularly spaced ribs.

8 Claims, 7 Drawing Figures

Patented April 24, 1973 3,729,204

Inventor:
Gustav Augustin

SEALING SLEEVE, ESPECIALLY FOR RADIAL SHAFT SEALING RINGS

The present invention relates to a sealing sleeve for a sealing ring, especially for a radial shaft sealing ring, with an inwardly located annular sealing lip, with a diaphragm adjacent to said sealing lip and extending in radial and/or axial direction, and with an outer adhering member.

Sealing sleeves of this type are used primarily for sealing rotating and axially moving shafts. The sealing sleeve may be so designed that it can be fastened in a machine housing by means of a radially extending flange or a similarly designed holding member directly by axially or radially clamping. The sealing sleeve, however, may also be formed into a cup-shaped housing.

With heretofore known shaft seals of this type, two essential factors, namely the life span and the employment limitations, are considerably affected by the heat which develops during the operation in view of friction between shaft and sealing edge because the friction heat may lead to a considerable heating up of the sealing lip and its surrounding. Such heating up brings about a relatively fast hardening of the sealing lip so that the latter has the tendency to form tears at its sealing edge. Moreover, the wear is considerably increased. In addition thereto, the sealing lip becomes sensitive to an increased degree against the influence which is exerted by the medium to be sealed, in other words, will have an increased tendency to swell and age.

The present invention is based on the finding that as decisive factor for friction and heating, the pressure at which the sealing edge is pressed against the surface of the shaft to be sealed has to be given special attention. This pressing force is to a major degree, depending on the widening which the sealing lip undergoes when being slipped onto the shaft. Furthermore, the said pressing force is dependent on the spring coefficient of the annular tension spring which may be employed for pressing the sealing lip against the part to be sealed. In addition thereto, it has been found that this pressing force depends to a great extent on the stiffness and consequently the thickness of the diaphragm adjacent the sealing lip. It has always been the tendency to select a relatively great thickness for the diaphragm because the diaphragm is intended so to fix the sealing lip thus along entire circumference of the sealing edge, the latter will rest upon the surface of the shaft in a plane perpendicular to the axis of the shaft, and on the other hand will so stiffen and strengthen the sealing lip that while the shaft is moving axially back and forth, the sealing lip wil not tilt about the sealing edge. Furthermore, the diaphragm is intended to assure such a reinforcing or stiffening of the sealing lip that during a heating up or swelling or softening, it will not permit a change in the contact angle while assuring a good transfer of the friction moment from the sealing lip to the hard part.

It is an object of the present invention to provide a sealing sleeve, especially although not exclusively, for radial shaft sealing rings, which will considerably increase the life of the sealing sleeve over heretofore known sealing sleeves of the type involved.

It is a further object of this invention to provide a sealing sleeve as set forth in the preceding paragraph, in which that portion of the pressing force which originated with the diaphragm will be eliminated or reduced to a minimum.

These and other objects and advantages of the invention will appear more clearly from the following specification in connection with the accompanying drawing, in which.

Figure 1:
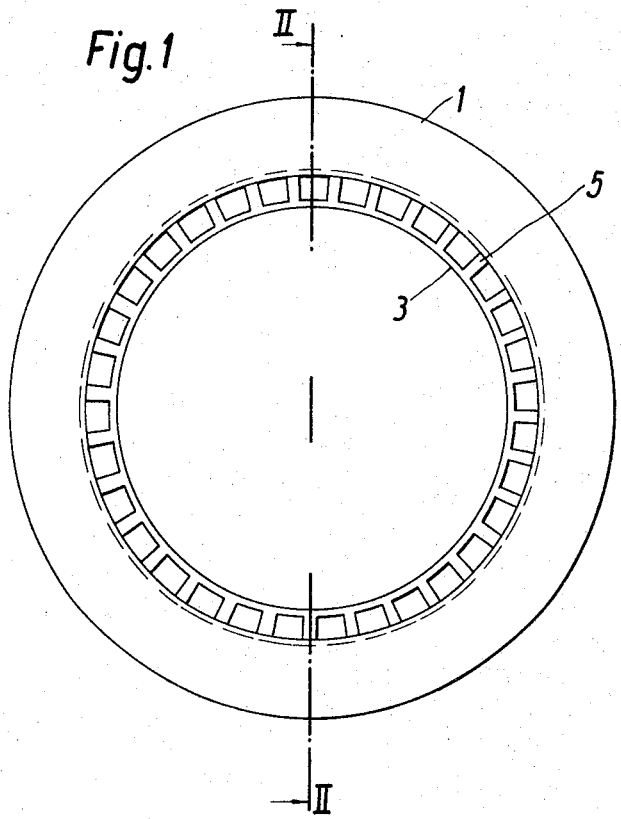
FIG. 1 is an axial view of a radial shaft sealing ring according to the invention.
Figure 2:
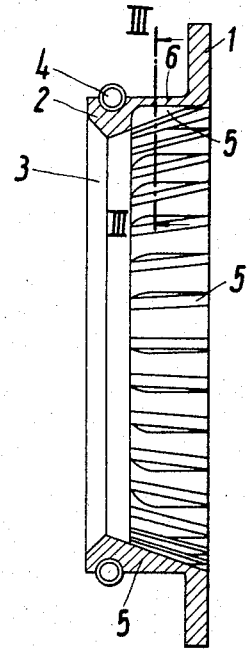
FIG. 2 is a section taken along the line II — II of FIG. 1.
Figure 5:
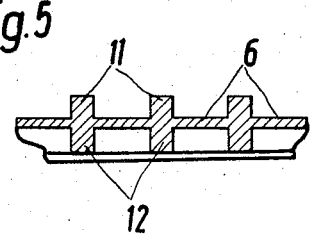
Figure 4:
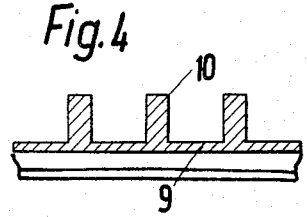
Figure 6:
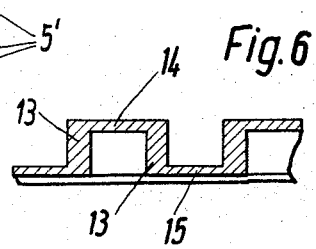

FIGS. 4–6 respectively illustrate modifications showing a cross section of the respective sealing ring, which cross section is similar to that taken along the line III — III of FIG. 2.

Figure 7:

FIG. 7 is a section similar to that of FIG. 2 and illustrating a further modification in accordance with the present invention.

The sealing sleeve according to the present invention, which is provided with an inner annular sealing lip and with a diaphragm adjacent to said sealing lip in radial and/or axial direction, and also with an outer adhering part, is characterized primarily in that the diaphragm located between the sealing lip and the adhering part is relatively very thin and has its inner and/or outer side provided with a plurality of circumferentially spaced ribs extending in radial and/or axial direction. It has been found particularly expedient to select the width of the ribs measured in circumferential direction less than the distance between two adjacent ribs.

Referring now to the drawing in detail, the sealing sleeve intended primarily as radial shaft sealing ring, comprises a holding member 1 forming a single integral piece of suitable synthetic material, and furthermore comprises a sealing lip 2 and a very thin-walled diaphragm 6 which connects the sealing lip with the holding member 1. The holding member 1 serves for connection in a machine housing or for insertion in a non-illustrated sheet metal housing. The sealing edge 3 of the sealing lip 2 is intended to rest on the circumferential surface of a non-illustrated rotatable and axially reciprocable shaft to prevent the passage of a medium to be sealed off, for instance, of a lubricant. In order to assure a snug engagement of the sealing edge with the shaft, an annular spring 4 is mounted over the circumference of the sealing lip.

Figure 3:
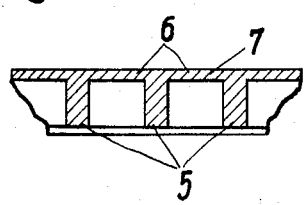
FIG. 3 is a section through a portion of the seal of FIG. 1, said section being taken along the line III — III of FIG. 2 and being shown as a development.

Inasmuch as the diaphragm 6 is intended on one hand to prevent a tilting of the sealing lip about the sealing edge 3 during an axial movement of the shaft and on the other hand must bend as little as possible and must not permit a change in the contact angle of the sealing lip when the latter is placed upon the shaft and widened, the diaphragm 6 is very thin over its free section located between the sealing lip and the adhering part, and has that inner side thereof which faces the shaft provided with a plurality of ribs 5, which, according to the cross section shown in FIG. 3, are circumferentially spaced from each other and extend in radial and axial direction while decreasing in cross section with increasing distance from the sealing lip 2 toward the holding member 1. According to the embodiment of FIG. 3, it is provided that the diaphragm 6 is located on the outer side of the sealing, whereas the webs or ribs are located on the side exposed to the air. In this way, a particularly good cooling of the sealing will be assured.

Advantageously, the ribs 5 are arranged so as to be parallel to axis direction. However, they may also be inclined to the axis and either toward the left or toward the right or alternately toward the left and toward the right. The distance of the ribs 5 from each other and also their thickness may be selected in conformity with the requirements. The terms "ribs" according to the present invention also covers ribs, the thickness of which exceeds the space between two ribs, which means that the present invention also covers designs according to which the spaces between the ribs have the shape of grooves which have been provided during the manufacture of the diaphragm.

According to the modification shown in FIG. 4, the diaphragm 9 is located on the inner side of the seal, whereas the webs 10 are located on the outside.

With the modification shown in FIG. 5, particularly favorable cooling conditions and a high flexibility are realized due to the fact that the very thin diaphragm 6 between the sealing lip (not shown in FIG. 5) and the holding member 1 has its inner as well as its outer side provided with radially extending ribs 11, 12.

FIG. 6 illustrates a further modification of the sealing ring according to the invention in which ribs 13 are in a greater number distributed over the circumference and while extending in radial direction are in pairs connected at the outside by thin diaphragm parts 14 and on the inside of the sealing sleeve are interconnected by thin diaphragm parts 15 so that a meander-shaped cross section is formed which excels in particularly low tangential pulling stresses during the placing of the sealing sleeve upon a shaft to be sealed. Moreover, in view of the obtained larger outer mantle surface exposed to the cooling surrounding air, a good heat withdrawal from the sealing sleeve will be assured which in turn results in a great life span and edge resistance of the seal.

FIG. 7 illustrates a further modification in which rib means 5' extend divergent from axial longitudinal plane location.

As will be seen from the above, the design according to the invention of the diaphragm serving as connection between the sealing lip and the adhering part differs from sleeves with relatively thick diaphragms primarily in that that portion of the radial force which originates with the diaphragm is only rather small, especially inasmuch as the web-shaped ribs cannot produce a radial force so that when the sealing sleeve widens no tangential pulling stresses can occur which could produce a component located in radial direction. In view of the fact that when slipping the sealing lip onto the shaft, a widening occurs which, with heretofore known seals, brings about an expansion of the sealing lip and the diaphragm. In such an instance, over the circumference tangential pulling stresses occur in the diaphragm which produce a pressure exerted upon the shaft and directed in radial direction. In contrast thereto, with the design according to the invention, and in particular due to the slight thickness of the diaphragm, only very low tangential and radial forces can occur. In addition thereto, in view of the webs or ribs, it will be assured that the sealing lip will be precisely held in its position in a stable manner. In this way, the sealing lip will be prevented from tilting about the sealing edge during an axial movement of the shaft, and the diaphragm will, during the widening of the sealing lip, be prevented from bending and changing the contact angle. Moreover, the seal according to the present invention will be less sensitive to bending during a change of the spacing of an annular spring which is placed over the sealing lip for supporting the sealing effect.

It is, of course, to be understood that the present invention is, by no means, limited to the particular showing in the drawing but also comprises any modifications within the scope of the appended claims.

What I claim is:

1. A sealing sleeve for a sealing ring especially for a radial-shaft-sealing ring which includes: a holding means, annular sealing lip means arranged in axially spaced relationship to said holding means for sealing engagement radially with a movable element to be sealed and formed by two conically tapered inner surfaces located between axially spaced opposite ends of the sleeve, relatively thin diaphragm means including inner and outer sides as well as essentially axially interconnecting said sealing lip means and said holding means, and a plurality of rib means connected to and reinforcing said diaphragm means against pivotal movements, said rib means being arranged in circularly spaced relationship to each other and being yieldable at axial ends thereof relative to said holding means adjacent to which the said rib means become weaker.

2. A sealing sleeve according to claim 1, in which said holding means forms a radially outwardly extending flange at one end of said diaphragm means.

3. A sealing sleeve according to claim 1, in which the width of the rib means measured in the circumferential direction of said diaphragm means is less than the spacing between directly adjacent rib means in the circumferential direction of said diaphragm means.

4. A sealing sleeve according to claim 1, in which only the inner side of said diaphragm means toward movable element location has rib means connected thereto.

5. A sealing sleeve according to claim 1, in which only the outer side of said diaphragm means away from movable element location has rib means connected thereto.

6. A sealing sleeve according to claim 1, in which said rib means taper from said holding section in the direction toward said lip means.

7. A sealing sleeve according to claim 1, in which said rib means extend in axial longitudinal plane location.

8. A sealing sleeve according to claim 1, in which said rib means extend divergent from axial longitudinal plane location.

* * * * *